United States Patent [19]

Schmidt et al.

[11] Patent Number: 4,462,127
[45] Date of Patent: Jul. 31, 1984

[54] APPARATUS FOR LOCATING AND SECURING AN OBJECT AT END POSITIONS BETWEEN WHICH THE OBJECT IS MOVABLE BACK AND FORTH

[75] Inventors: Werner Schmidt; Gerhard Watzek, both of Munich, Fed. Rep. of Germany

[73] Assignee: Maschinenfabrik Augsburg-Nurnberg, Munich, Fed. Rep. of Germany

[21] Appl. No.: 373,744

[22] Filed: Apr. 30, 1982

[30] Foreign Application Priority Data

May 8, 1981 [DE] Fed. Rep. of Germany ....... 3118337

[51] Int. Cl.$^3$ ............................................. A47C 19/16
[52] U.S. Cl. .......................................... 5/118; 5/9 R; 292/171
[58] Field of Search ............ 5/9 R, 10 R, 10 B, 55 R, 5/118, 167; 292/38, 171, DIG. 40, DIG. 51, DIG. 36, DIG. 55; 108/44; 297/331; 296/169, 190

[56] References Cited

U.S. PATENT DOCUMENTS

| | | | |
|---|---|---|---|
| 1,078,908 | 11/1913 | Fischrupp | 5/55 B |
| 2,504,769 | 4/1950 | Watter | 5/107 |
| 3,164,849 | 1/1965 | Poskin | 5/55 R |
| 3,282,617 | 11/1966 | Wason | 292/171 |
| 3,565,475 | 2/1971 | Foss | 292/171 |
| 4,078,269 | 3/1978 | Weipert | 5/118 |
| 4,138,949 | 2/1979 | Gutridge et al. | 5/9 R |
| 4,215,899 | 8/1980 | Schmidt et al. | 5/118 |

Primary Examiner—Alexander Grosz
Assistant Examiner—Michael F. Trettel
Attorney, Agent, or Firm—Posnack, Roberts, Cohen & Spiecens

[57] ABSTRACT

Apparatus for locating and securing an object in first and second end positions between which it is movable comprising two parallel pivot arms which support the object for movement between its end positions and fittings at the end positions on both sides of the object. The fittings are provided with inclined guide surfaces and latching holes adapted for receiving latching pins on the object under spring pressure when the object is at the end positions. Located around the latching pins are guide nuts adapted for cooperating with the inclined guide surfaces in order to position the object as it approaches and occupies its end positions. The inclined guide surfaces of the fittings face one another and converge in the direction of entry of the object between the fittings. The fittings also have guide surfaces extending perpendicular to the inclined guide surfaces whereby the guide nuts are guided along their end faces and along circumferential guide surfaces. The circumferential guide surfaces of the guide nuts are urged against the associated guide surfaces of the fittings by a gas cartridge pivotally connected to the pivot arms and the object.

9 Claims, 6 Drawing Figures

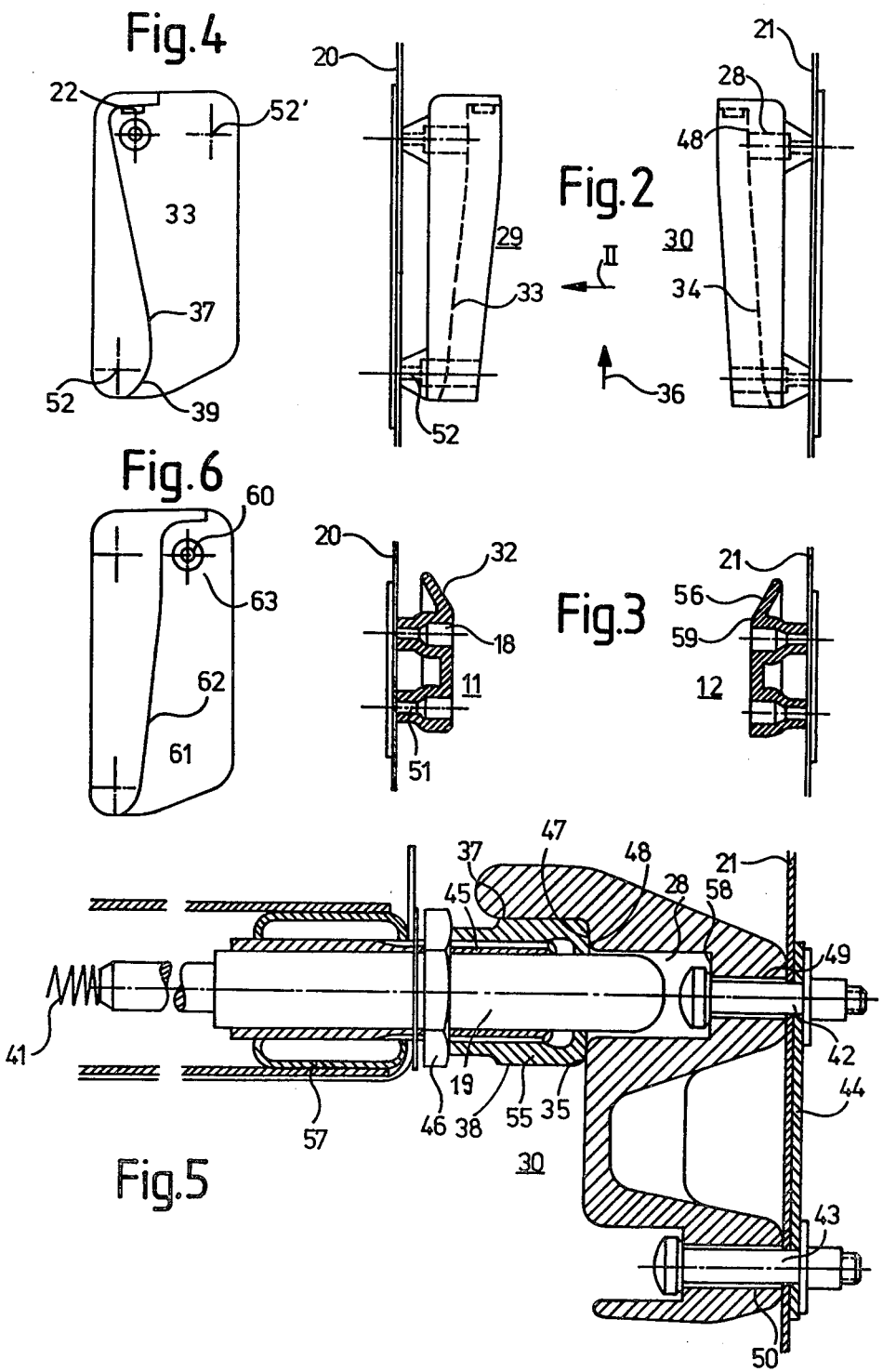

APPARATUS FOR LOCATING AND SECURING AN OBJECT AT END POSITIONS BETWEEN WHICH THE OBJECT IS MOVABLE BACK AND FORTH

FIELD OF THE INVENTION

The invention relates to apparatus for locating and securing an object at end positions between which the object is movable back and forth.

More particularly, the invention relates to apparatus for securing a cot in the cab of a long-haul truck in end positions between which it is pivotable. More particularly, the cot is movable from one end position which is a horizontal operative position, for example, disposed next to a second cot to a second end position in which the cot is substantially horizontally stowed above the second cot.

At each of the end positions of the cot there are disposed stationary fittings on both sides of the cot, each fitting having a latching hole adapted for receiving, under spring pressure, a respective latching pin mounted on the cot.

PRIOR ART

Apparatus of the above type for a pivotable cot in the cab of a long-haul truck has been disclosed in German Patent Specification DE-OS No. 27 39 415.

A deficiency in the known construction is that at last one of the two latching pins may not enter the latching hole as a result generally of tolerance build-up, i.e. deviations from specified dimensions. These generally involve tolerances in the position of the fittings at the end positions and mainly in the relative distance from side panels, especially of the truck cab, and/or of the relative position of holes in the side panels, said fittings preferably being attached to the side panels or similar members by means of bolts inserted through the holes.

SUMMARY OF THE INVENTION

It is a particular object of the present invention to provide an arrangement in which the fittings at each of the end positions have inclined guide surfaces facing one another defining a converging space in the direction of entry of the object, and guide means preferably in the form of a guide nut is mounted on the object and slidably receives each pin, said guide surfaces being positioned to guide said guide means and act upon the respective associated pins to displace said pins against the action of the spring means until the pins reach the latching holes and engage therein.

The fittings serve as latching wedges and their guide surfaces are inclined at such an angle with respect to the direction of entry of the object to safely guide the object, or said tubular nuts, and achieve safe latching. At least one guide surface or edge of the tubular nut can slide during the entering movement along at least one respective inclined guide surface of the latching wedge and the two latching pins then safely enter the latching holes when the object obtains its extreme position. The construction of the invention thus serves to compensate for tolerances. Each latching wedge comprises a member provided with the latching hole and at least one inclined guide surface. The guide members on the object are mounted in a most favorable location structurally and in most favorable manner, and considering that they are constituted as tubular nuts, they can be adjusted axially to position the object properly between the latching wedges arranged on either side thereof.

It is a feature of the invention that the two converging guide surfaces on the latching wedges provide good wedged guidance of the guide faces of the tubular nuts and hence safe latching.

In accordance with another feature of the invention, second inclined surfaces are provided on the fittings extending normal to the first inclined surfaces to cooperate with circumferential guide surfaces of the tubular nuts. This makes for safer latching.

In accordance with a further feature of the invention, the second guide surfaces have substantially rounded entry sections to facilitate the start of the entering movement.

In accordance with still another feature of the invention, the guide nuts are threaded onto sleeves on the object to a depth controlled by adjustable stop nuts, which is a practical and simple construction enabling fitting of the object between the two latching wedges.

According to still another feature of the invention, a gas cartridge is pivotably mounted between the object and a pivot arm itself pivotably connected to the object for moving the object between the end positions. The gas cartridge acts to urge the guide nuts against the respective second guide surfaces of the latching wedges at one of the end positions to insure safer latching.

In a particular preferred embodiment, the latching wedges are made of a plastic material. Preferably, such plastic latching wedges have steel inserts forming or enclosing mounting holes and/or the latching holes in the fittings.

Although the invention will be described in relation to a pivotably movable cot, the inventive concept also embraces the locating of reciprocating, tilting or moving members, such as drawers or lids. The latching wedges of the present invention are applicable also in connection with latching, ratchet, catching, snap-in or arresting devices other than the latching hole and pin type of device as disclosed.

BRIEF DESCRIPTION OF THE FIGURES OF THE DRAWING

FIG. 2 illustrates on enlarged scale, but with the relative spacing reduced, two upper latching wedges as viewed in the direction of arrow A in FIG. 1.

FIG. 3 similarly illustrates, but in section, lower latching wedges as viewed in the direction of arrow B in FIG. 1.

FIG. 4 is an elevation view of the upper right latching wedge as viewed in the direction of arrow II in FIG. 2.

FIG. 5 is a longitudinal sectional view taken on line V—V in FIG. 1 illustrating, on enlarged scale, the left upper latching wedge and the left tubular guide nut with the associated latching pin in its latched position.

FIG. 6 is an elevation view of a latching wedge similar to that in FIGS. 2 and 4 for a linearly reciprocable object.

DETAILED DESCRIPTION

Figure 1:
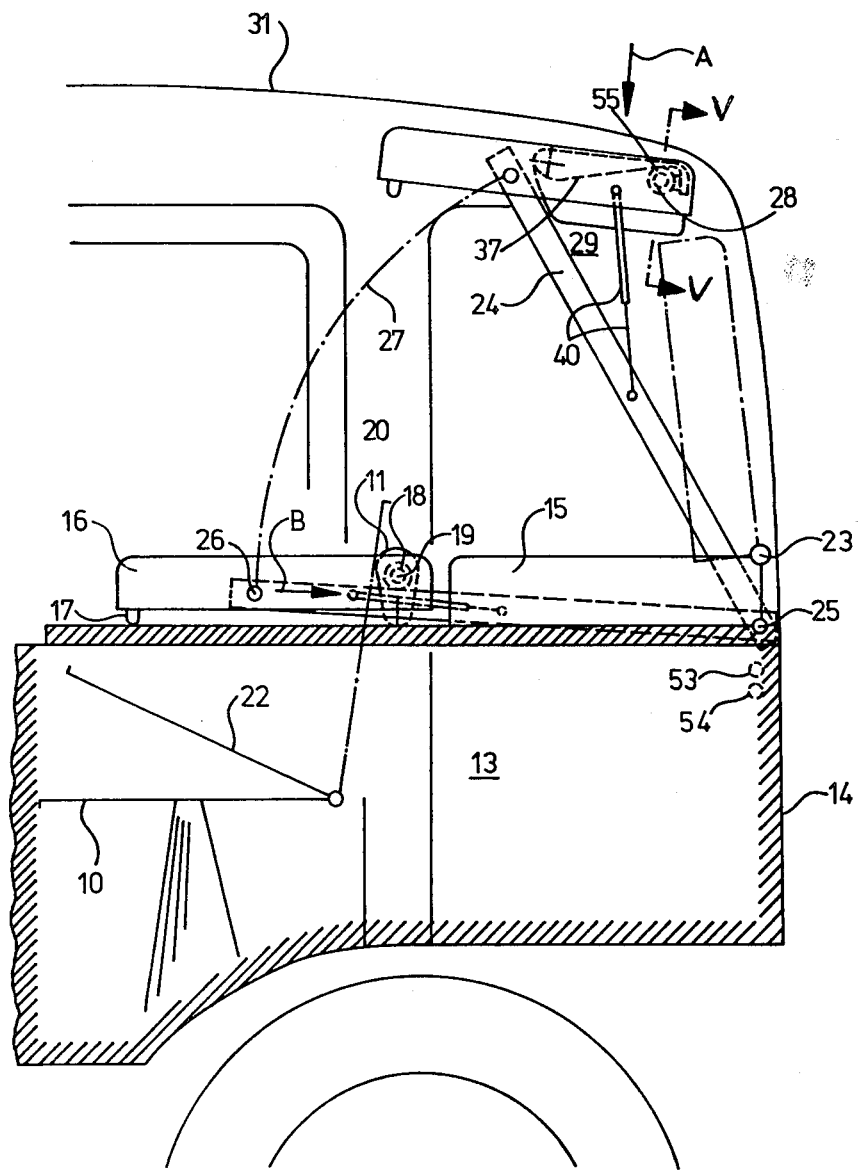
FIG. 1 diagrammatically illustrates, in elevation, a first embodiment of the invention in the form of two cots in the cab of a long-distance truck, the left side of the truck cab being removed for clarity of presentation.

With reference now to FIG. 1, therein is seen a portion of the cab of a long-haul truck, the front part being broken away. Diagrammatically shown in FIG. 1 is a driver's seat 10 which faces forwardly. A second seat (not shown) is placed next to the driver's seat 10. Two back rests 22 are shown folded forwardly from the chain dotted service position to an inclined position. Caravan equipment 13 is provided between and behind the seats as far back as the rear panel 14 of the cab and from the cab floor to almost one-half the height of the cab, the equipment being outlined in shaded contour. Also arranged in the cab is a first cot 15 and a second cot 16.

The cots 15 and 16 are arranged in parallel, side by side relation in the horizontal service position, the cot 16 being in front of cot 15 and above the back rests 22 when folded. The cots 15 and 16 are arranged above the caravan equipment 13 upon which they rest in operative position as shown in FIG. 1. Cot 16 is provided with a handle 17 at its forward end which rests on the caravan equipment when in the lowered position shown in FIG. 1. At its rear end, the cot 16 is located or latched into position by means of two lateral, horizontally extending latching pins 19 provided on the cot 16 to engage, under spring pressure, in two latching holes 18. The latching holes 18 are provided in two similar lower latching wedges 11, 12 attached to two side panels 20 and 21 of the truck cab as evident from FIGS. 1 and 3. The wedges 11 and 12 are preferably made of a plastic material.

The cot 15 can be folded or pivoted upwards almost against the exposed portion of the rear panel 14 about a horizontal pivot 23 extending along the rear panel 14 to an approximately vertical stowed position (shown in chain-dotted outline in FIG. 1). The cot 16 is moved or pivoted into an approximately horizontal stowed position, with a slight downward tilt to the rear, above the cot 15 by means of a lifting device comprising two lateral pivot arms 24 which undergo pivotal movement in two vertical longitudinally extending planes. The arms 24 are supported in bearings 25 mounted on the rear panel 14 below the cot 15 and the arms 24 are pivtobaly connected to the cot 16, by means of bearings 26, in the central area of the cot. Pivotal movement of the cot is possible after the latching pins 19 have been withdrawn, against the force of springs, from the latching holes 18 by means of a Bowden cable (not shown). The cot 16 is pivoted by hand with assistance provided by two torsion bar springs 53, 54 which extend horizontally along the entire rear panel 14, intersecting one another and abutting with respective curved ends against pivot arm 24 and with opposite curved ends on the rear panel 14. When the cot 16 is being pivoted, the bearings 26 travel along arc 27 shown in chain-dotted lines. In order to locate the cot 16 in its stowed position, the two latching pins 19 enter two latching holes 28 under spring pressure (after the Bowden cable has been released). The holes 28 are provided in two upper wedges 29 and 30 attached to the two side panels 20 and 21 as shown in FIGS. 1 and 2. Although the upper latching wedges 29 and 30 are not identical as evident from FIGS. 2 and 4, they are mirror-inverted twins.

In its stowed position, the cot 16 extends slightly below the rear end of the roof 31 of the cabin and approximately parallel with this end of the roof. The somewhat inclined stowed position results from the position of the latching holes 28 and thus, from the position of the latching wedges 29 and 30 relative to that of the bearing 26 as governed by the position of the pivot arms 24.

As it will become apparent from FIGS. 1 to 5, the latching wedges 11, 12, 29 and 30 have respective guide surfaces 32, 56 (FIG. 3), 33 and 34 (FIG. 2) for the guidance of a tubular nut 55 arranged coaxially around each of the two latching pins 19 on the cot 16. The two lower latching wedges 11 and 12 are provided with the two lateral, mutually converging guide surfaces 32 and 56 for guidance of a guide edge 35 or guide face 47 of the tubular nut 55. The two upper latching wedges 29 and 30 are provided with the two lateral guide surfaces 33 and 34, which coverge to a lesser degree than the guide surfaces 32 and 56, for guidance of the guide edge 35 or guide face 47. Arrow 36 (FIG. 2) points in the direction of entry of the cot 16 with the pins 19 and the tubular nuts 55 into the space between the upper latching wedges 29 and 30. Each of the two upper latching wedges 29 and 30 has an inclined guide surface 37 (FIG. 4) which extends normal to the moderately converging guide surfaces 33 and 34, for guidance of a circumferential guide surface 38 of the tubular nut 55.

As seen in FIG. 1, the upper latching wedges 29 and 30 extend in substantially the same, moderately inclined direction as the cot 16 in its stowed position, and the inclined guide surface 37, which serves as a track for the tubular nut 55, extends such that the tubular nut 55 slides along surface 37 until in its extreme position the latching pin 19 enters the latching hole 28 under spring pressure. The inclined guide surface 37 has a markedly rounded entry section 39 as seen in FIG. 4. In its entry movement, the circumferential guide surface 38 of the tubular nut 55 is urged against the guide surface 37 by means of a gas cartridge 40 which can be a pneumatic cylinder. The gas cartridge 40 is hinged at one end to the pivot arm 24 and is hinged at its other end to the cot 16. Behind the latching hole 28, the latching wedges 29 and 30 are fitted with rubber stops 22 for the tubular nut 55 as shown in FIG. 4.

The mutually converging guide surfaces 33, 34 on the upper latching wedges 29 and 30 form, together with the guide surfaces 37, entry zones for the safe guidance of the cot 16 and tubular nuts 55 and for safe latching action.

With reference now to FIG. 5, therein it is seen that the latching pin 19 has entered, under the pressure of helical compression spring 41, the latching hole 28 of the latching wedge 30. The helical compression spring 41 is under tension both in the unlatched and in the latched conditions. The latching wedge 30 is attached to the side panel 21 by means of mounting bolts 42,43 extending through mounting holes 49 and 50 in the latching wedge 30. A plate 44 serves to stiffen the side panel 21 and strengthen the attachment. The latching hole 28 and the mounting hole 49 are aligned with one another, the diameter of the mounting hole 49 being smaller than the diameter of the latching hole 28 to provide an abutment face 58 for the head of bolt 42. The same construction is utilized for the latching wedges 11 and 12 with their latching holes 18. Welded to a frame 57 of the cot 16 is a sleeve 45 to receive the latching pin 19. Tubular nut 55 is screwed on the sleeve 45 until it abuts against an adjustable stop constituted by a check nut 46. With its circumferential guide surface 38, the tubular nut 55 abuts against the guide surface 37 of the latching wedge 30, and with its guide face 47 against surface 48 of the latching wedge 30 which follows the guide surface 34 and extends normal to the axis of the latching hole 28 as seen in FIGS. 5 and 2. The latching wedges 11, 12, 29 and 30 have further holes 50, 51 and 52 to receive bolts 43 for attaching the latching wedges to the side panels 20 and 21. The latching wedges 29 and 30 are also preferably made of a plastic material. When made of plastic, wedges 29 and 30 have hole-reinforcing steel inserts (not shown) to form the mounting holes 49 and to enclose the latching hole 28 formed in the plastic material in the interior of the latching wedge.

The two end surfaces 48 of the two latching wedges 29 and 30 extend parallel in vertical, longitudinally oriented planes as seen in FIG. 2. This applies equally to the two end surfaces 59 of the two lower latching wedges 11 and 12 as seen in FIG. 3.

The latching wedge of FIG. 6 has a latching hole 60, a guide surface 61 inclined in a manner similar to the guide surface 33, an end surface 63 similar to surface 48 and an inclined guide surface 62 extending normal to the guide surface 61 and having an inclination opposite that of guide surface 37. With two such latching wedges disposed in mirror-inverted arrangement as in FIG. 2, the guide surfaces 61 will again converge and form, together with the inclined guide surfaces 62, two entry zones to safely guide the cot and the tubular nuts 55 and achieve safe latching with the end surfaces 63 extending parallel to one another.

With the apparatus of the present invention, the cot can be pivotally connected to (and not merely provided on) the lifting and pivoting arms 24, as at the bearings 26.

Although the invention has been described in connection with a specific apparatus, it will become apparent to those skilled in the art that numerous modifications and variations can be made within the scope and spirit of the invention as defined in the attached claims.

What is claimed is:

1. In apparatus for the movement of an object back and forth between first and second end positions comprising fittings at least at one of said end positions located on opposite sides of said object, said object having latching pins mounted on opposite sides thereof, said fittings having latching holes adapted for receiving the latching pins mounted on the object and spring means resiliently urging the latching pins to a position for engaging in the latching holes, the improvement wherein said fittings have inclined guide surfaces facing one another defining a converging space in the direction of entry of said object, guide means on said object slidably receiving each pin, said guide surfaces being positioned to guide said guide means and act upon the respective associated pins to displace said pins against the action of the spring means until the pins reach the latching holes and engage thereinto, each said guide means comprising a guide nut around each pin, said guide nut having a guide surface for riding on the inclined guide surface on the respective fittings.

2. The improvement as claimed in claim 1 wherein each said guide nut has an end face constituting said guide surface.

3. The improvement as claimed in claim 2 wherein each of the fittings at one of said end positions has a second inclined guide surface extending perpendicularly to the first guide surface, each said guide nut having a second guide surface for riding on the second guide surface of the respective fittings.

4. The improvement as claimed in claim 3 wherein each said guide nut is tubular and said second guide surface is constituted by the circumferential surface thereof.

5. The improvement as claimed in claim 4 wherein said second guide surface on each fitting has a substantially rounded entry section.

6. The improvement as claimed in claim 4 wherein said object is pivotably movable from a lowered horizontal first end position to a raised, substantially horizontal second end position, hinge arms being provided to pivotably move the object between said end positions, said arms being pivotally connected to said object at the opposite sides thereof, the improvement further comprising operating means coupled to said hinge arms and the object to urge the circumferential guide surfaces of said guide nuts against said second guide surfaces of the fittings at the second end position.

7. The improvement as claimed in claim 6 wherein said operating means comprises a pneumatic cylinder.

8. The improvement as claimed in claim 1 or 4 wherein said object includes sleeves on the opposite sides thereof slidably receiving said pins, said guide nuts being secured on said sleeves.

9. The improvement as claimed in claim 8 wherein said guide nuts are threaded on said sleeves, the improvement further comprising stop means on said sleeves for controlling the depth to which the guide nuts can be threaded on said sleeves.

* * * * *